US007184197B2

(12) United States Patent
Liang et al.

(10) Patent No.: US 7,184,197 B2
(45) Date of Patent: Feb. 27, 2007

(54) HIGH PERFORMANCE CAPSULES FOR ELECTROPHORETIC DISPLAYS

(75) Inventors: Rong-Chang Liang, Cupertino, CA (US); HongMei Zang, Sunnyvale, CA (US)

(73) Assignee: SiPix Imaging, Inc., Fremont, CA (US)

( * ) Notice: Subject to any disclaimer, the term of this patent is extended or adjusted under 35 U.S.C. 154(b) by 99 days.

(21) Appl. No.: 10/766,757

(22) Filed: Jan. 27, 2004

(65) Prior Publication Data

US 2004/0182711 A1 Sep. 23, 2004

Related U.S. Application Data

(60) Provisional application No. 60/443,893, filed on Jan. 30, 2003.

(51) Int. Cl.
*G02B 26/00* (2006.01)
(52) U.S. Cl. .................................. 359/296
(58) Field of Classification Search ............. 359/296; 204/600, 450; 430/32, 34, 38; 345/107
See application file for complete search history.

(56) References Cited

U.S. PATENT DOCUMENTS

| | | | |
|---|---|---|---|
| 3,281,426 A | 10/1966 | Tiers | |
| 3,612,758 A | 10/1971 | Evans et al. | |
| 4,285,801 A * | 8/1981 | Chiang ....................... | 252/570 |
| 5,930,026 A | 7/1999 | Jacobson et al. | |
| 5,961,804 A | 10/1999 | Jacobson et al. | |
| 6,017,584 A | 1/2000 | Albert et al. | |
| 6,067,185 A | 5/2000 | Albert et al. | |
| 6,120,588 A | 9/2000 | Jacobson | |
| 6,120,839 A | 9/2000 | Comiskey et al. | |
| 6,130,774 A | 10/2000 | Albert et al. | |
| 6,172,798 B1 | 1/2001 | Albert et al. | |
| 6,177,921 B1 | 1/2001 | Comiskey et al. | |
| 6,241,921 B1 | 6/2001 | Jacobson et al. | |
| 6,249,271 B1 | 6/2001 | Albert et al. | |
| 6,262,706 B1 | 7/2001 | Albert et al. | |
| 6,262,833 B1 * | 7/2001 | Loxley et al. .............. | 359/296 |
| 6,323,989 B1 * | 11/2001 | Jacobson et al. .......... | 359/296 |
| 6,372,838 B1 * | 4/2002 | Rao et al. .................. | 524/462 |
| 6,473,072 B1 | 10/2002 | Comiskey et al. | |
| 2003/0207963 A1 * | 11/2003 | Zang et al. ................. | 523/200 |
| 2006/0132896 A1 * | 6/2006 | Hsu et al. .................. | 359/296 |

FOREIGN PATENT DOCUMENTS

| | | |
|---|---|---|
| EP | 0 512 800 A | 11/1992 |
| EP | 0 559 254 A | 9/1993 |
| JP | 60 126657 A | 11/1985 |
| WO | WO 00/03291 | 1/2000 |
| WO | WO 00/20921 | 4/2000 |
| WO | WO 00/20922 | 4/2000 |
| WO | PCT/US04/002918 | 6/2004 |

OTHER PUBLICATIONS

Allen, K. << Electrophoretics Fulfilled >>, iSuppli Corporation, Emerging Displays Review, Oct. 2003, pp. 9-14.
Chen, S.M., << The Applications for the Revolutionary Electronic Paper Technology >>, OPTO News & Letters, Jul. 2003, 102, pp. 37-41 (in Chinese, English abstract attached, full translation available upon request).
Chen, S.M., << The New Applications and the Dynamics of Companies >>, TRI, May 2003 (in Chinese, English abstract attached, full translation available upon request).
Chung, J. Et al. << Microcup(R) Electrophoretic Displays, Grayscale and Color Rendition >>, IDW '03, pp. 243-246.
Drzaic, "Liquid Crystal Dispersions", World Scientific Publishing Co., 1995.
Gutcho, "Microcapsules and Microencapsulation Techniques", Noyes Data Corp., Park Ridge, N. J. (1976).
Hopper M. A. and Novotny V., IEEE Transactions on Electron Devices, 26(8), pp. 1148-1152 (1979).
Kondo, A., "Microcapsule Processing and Technology", Marcel Dekker, Inc. (1979).
Liang, R.C. and Lee, H., << SiPix Microcup(R) Electronic Paper—An Introduction >>, Advanced Display, 2003, Issue 3, pp. 4-9 (in Chinese, English abstract attached, full translation available upon request).
Liang, R.C. and Tseng, S., << Microcup(R) LCD, A New Type of Dispersed LCD by A Roll-to-Roll Manufacturing Process >>, IDMC '03, Taipei, Liang, Paper We-02-04.
Liang, R.C. et al, << Microcup Electrophoretic Displays by Roll-to-Roll Manufacturing Processes >>, IDW '02, pp. 1337-1340.
Liang, R.C. et al, << Microcup(R) Active and Passive Matrix Electrophoretic Displays by A Roll-to-Roll Manufacturing Processes >>, SID Digest, 2003, 20.1/R.C. Liang.
Liang, R.C. et al, << Microcup(R) displays: Electronic Paper by Roll-to-Roll Manufacturing Processes >>, Journal of the SID, 11/4, 2003, pp. 621-628.
Liang, R.C. et al, << Passive Matrix Microcup(R) Electrophoretic Displays >>, IDMC '03, Taipei, Liang, Paper Fr-17-5.
Liang, R.C., << Microcup (R) Electrophoretic and Liquid Crystal Displays by Roll-to-Roll Manufacturing Processes >>, USDC Flexible Microelectronics & Displays Conference, Phoenix, Arizona, USA.
Vandegaer, J. E., ed. "Microencapsulation: Processes and Applications", Plenum Press, New York, N. Y. (1974).
Zang, H.M. and Liang, R.C., << Microcup Electronic Paper by Roll-to-Roll Manufacturing Processes >>, Spectrum, 2003, 16/2, pp. 16-21.
Ho, C., et al. "Microcup (R) Electronic Paper by Roll-to-Roll Manufacturing Processes", Presentation Conducted at FEG, Nei-Li, Taiwan, (Dec. 2003).
Nikkei Microdevices, "Newly-Developed Color Electronic Paper Promises—Unbeatable Production Efficiency", Nikkei Microdevices, 3, (in Japanese, with English translation), (Dec. 2002).
Zang, H.M., et al., "Threshold and Grayscale Stability of Microcup (R) Electronic Paper", *Proceeding of SPIE-IS&T Electronic Imaging*, SPIE vol. 5289, pp. 102-108 (Jan. 2004).
Zang, H.M., et al., "Microcup Electronic Paper by Roll-to-Roll Manufacturing Processes", *Spectrum*, 2003, 16/2, pp. 16-21.

* cited by examiner

*Primary Examiner*—Ricky Mack
*Assistant Examiner*—Tuyen Tra
(74) *Attorney, Agent, or Firm*—Howrey LLP

(57) ABSTRACT

The present invention is directed to novel non-aqueous capsules suitable as display cells for an electrophoretic display and the encapsulation process for their manufacture.

35 Claims, No Drawings

HIGH PERFORMANCE CAPSULES FOR ELECTROPHORETIC DISPLAYS

RELATED APPLICATION

This application claims the priority under 35 USC 119(e) of U.S. Provisional Applications No. 60/443,893, filed Jan. 30, 2003. The whole content of the priority application is incorporated into this application by reference.

BACKGROUND OF THE INVENTION

1. Field of the Invention

The electrophoretic display is a non-emissive device based on the electrophoresis phenomenon of charged pigment particles suspended in a solvent. It was first proposed in 1969. The display usually comprises two plates with electrodes placed opposing each other, separated by using spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

In order to prevent undesired movement of the particles, such as sedimentation, partitions between the two electrodes were proposed for dividing the space into smaller cells (see M. A. Hopper and V. Novotny, IEEE Trans. Electr. Dev., 26(8):1148–1152 (1979)). However, in the case of partition-type electrophoretic displays, difficulties were encountered in the formation of the partitions and the process of enclosing the suspension. Furthermore, it was also difficult to keep suspensions of different colors separate from each other in the partition-type electrophoretic display.

Another type of EPD (see U.S. Pat. No. 3,612,758) has electrophoretic cells that are formed from parallel line reservoirs (the channel or groove type). The filling and sealing of the electrophoretic fluid in the channels are accomplished by a batch-wise process. However, the problem of undesirable particle movement or sedimentation, particularly in the longitude direction, remains an issue.

Subsequently, attempts were made to enclose the electrophoretic dispersion in microcapsules. U.S. Pat. Nos. 5,961,804, 5,930,026, 6,017,584, 6,067,185, 6,262,706 and U.S. Patent Application Pub. No. 2002/0185378A1 published on Dec. 12, 2002 describe microcapsule-based electrophoretic displays. The microcapsule type display has a substantially two dimensional arrangement of microcapsules each having therein an electrophoretic composition of a dielectric solvent and a suspension of charged pigment particles that visually contrast with the dielectric solvent. The diameter of the electrophoretic microcapsules is usually in the order of $10^1$ to $10^2$ μm and are typically prepared in an aqueous phase by a process such as simple or complex coacervation, interfacial polymerization or in-situ polymerization. Review of microencapsulation processes can be found in, for example, A. Kondo, "Microcapsule Processing and Technology", Marcel Dekker, Inc., (1979); J. E. Vandegaer, ed., "Microencapsulation, Processes and Applications", Plenum Press, New York, N.Y. (1974); and Gutcho, "Microcapsules and Microencapsulation Techniques", Noyes Data Corp., Park Ridge, N.J. (1976), all of which are herein incorporated by reference. In the coacervation process, an oil/water emulsion is formed by dispersing the electrophoretic composition in an aqueous environment. One or more colloids are coacervated out of the aqueous phase and deposited as shells around the oily droplets through control of temperature, pH and/or relative concentrations to create the microcapsules. The interfacial polymerization approach relies on the presence of an oil-soluble monomer in the electrophoretic composition which is present as an emulsion in an aqueous phase. The monomers in the minute hydrophobic droplets react with a monomer introduced into the aqueous phase, polymerizing at the interface between the droplets and the surrounding aqueous medium and forming shells around the droplets. In the in-situ polymerization approach, the monomers that will form the microcapsule shell are present in the aqueous phase rather than within the dispersed-phase droplets.

After formation of the microcapsules containing the electrophoretic composition, the microcapsules may be printed or coated onto an electrode substrate by a method such as that used to deposit pressure-rupturable microcapsules onto a substrate to create a carbonless copy paper. The microcapsules may be immobilized within a transparent matrix or binder and sandwiched between two electrodes or substrates. Alternatively, a polymeric protection layer may be overcoated onto the microcapsule layer for applications such as the rewritable recording sheet as disclosed in, for example, U.S. Pat. No. 6,473,072 and U.S. Patent Application Pub. No. 2001/0055000A1 filed on Apr. 2, 2001.

The electrophoretic displays based on microcapsules prepared in an aqueous phase, however, suffer many drawbacks. For example, in order to stabilize the oil-in-water emulsion, a hydrophilic surfactant or protective colloid is needed. It, however, is often very difficult and costly to remove the unwanted hydrophilic additives from the capsule surface and the aqueous phase. Secondly, the shell formed at the capsule/water interface tends to be hydrophilic and softenable or plasticizable by moisture. Thirdly, strong charge controlling agents (CCAs) typically employed to enhance the electrophoretic mobility or switching rate of an electrophoretic display are often very difficult to be encapsulated in the dispersed phase. They tend to migrate to the water-shell interface or the aqueous phase during the encapsulation process, and as a result, are not effective in enhancing the switching rate. Further, in the capsule-based display, a binder is an essential ingredient of the capsule coating or printing composition. For microcapsules prepared from an aqueous phase, a water-based binder may be used at the expense of resistance to humidity in the final display prepared. Alternatively, the capsules may be dried, purified and redispersed into a non-aqueous binder. However, the drying, purification and redispersion steps are often of low yield and high cost because of irreversible flocculation or coagulation and undesirable rupture of the capsules. The above-mentioned problems associated with the capsules prepared in an aqueous phase result in electrophoretic displays of poor humidity resistance, low electrophoretic mobility or low switching rate and high cost of manufacturing.

Alternatively, capsules may be formed by dry processes similar to those employed to form the dispersed type of liquid crystal displays [See Drzaic in "Liquid Crystal Dispersions" (1995)]. For example, U.S. Pat. No. 5,930,026 discloses a process of forming a capsule type of electrophoretic coating on an electrode substrate by first emulsifying an electrophoretic composition in a UV curable resin, followed by UV curing to suspend and immobilize the emulsion droplets in the cured resin on the substrate to form a polymer-dispersed electrophoretic display. No oil-in-water emulsion is involved in this process. However, a very broad capsule size distribution with a significant amount of useless small capsules is often obtained. It is very difficult to control the capsule size distribution, and once the capsules are formed, there is no way to remove the unwanted capsules.

To prepare humidity resistant electrophoretic capsules that are compatible with strong CCAs, an encapsulation process such as interfacial or in-situ polymerization/ crosslinking in a non-aqueous phase may be employed. However, it is very difficult to find a satisfactory immiscible solvent pair in which one is the dielectric solvent of the electrophoretic fluid phase and the other does not compete with the pigment particles in the dielectric solvent for CCAs or the protective colloid(s). Moreover, to achieve satisfactory physicomechanical properties, the capsule shell must be a good solvent barrier with a thickness sufficient to protect the capsules from being unintentionally ruptured during handling or coating. Therefore there has been a strong need for capsule-based display cells having improved physicomechanical properties and also a solvent resistant shell of acceptable thickness.

SUMMARY OF THE INVENTION

The present invention is directed to novel non-aqueous capsules useful for the capsule type of electrophoretic devices and a novel process for its preparation. The resultant electrophoretic devices show significantly improved switching rate and resistance to humidity. In addition, the present invention allows low manufacturing cost because no drying, purification or re-dispersion of the capsules is needed to remove water or undesirable hydrophilic impurities.

The first aspect of the present invention is directed to non-aqueous electrophoretic capsules comprising a halogenated (preferably fluorinated) polymeric shell and an electrophoretic composition enclosed therein wherein said electrophoretic composition comprises charged pigment particles or pigment-containing microparticles dispersed in a dielectric solvent.

The second aspect of the invention is directed to an encapsulation process for the preparation of non-aqueous capsules suitable as display cells for an electrophoretic display. The process comprises emulsifying an internal phase comprising a halogenated solvent, pigment particles or pigment-containing microparticles dispersed in the halogenated solvent and a halogenated shell-forming material, into an external phase comprising a complementary reactant or crosslinker in an organic solvent.

The third aspect of the invention is directed to an electrophoretic display or device comprising:

a) an arrangement of non-aqueous capsules comprising a halogenated (preferably fluorinated) polymeric shell and an electrophoretic composition enclosed therein wherein said electrophoretic composition comprises charged pigment particles or pigment-containing microparticles dispersed in a dielectric solvent;

b) a binder binding the non-aqueous capsules, and c) a first substrate on which the capsules and binder are coated.

DETAILED DESCRIPTION OF THE PRESENT INVENTION

Unless defined otherwise in this specification, all technical terms are used herein according to their conventional definitions as they are commonly used and understood by those of ordinary skill in the art.

The term "microcapsule" or "capsule" is used to refer to the microcapsules or capsules which serve as the display cells or compartments of an electrophoretic display and each microcapsule or capsule, in the context of the present invention, encapsulates therein an electrophoretic composition.

The term "pigment-containing microparticle" is used to refer to the coated or encapsulated pigment particles dispersed in a dielectric solvent of an electrophoretic fluid. The pigment particles may be coated or encapsulated by an organic or inorganic material, preferably a polymeric material. There may be more than one pigment particle in the pigment-containing microparticles.

The term "internal phase" is defined as the dispersed phase during a liquid-liquid encapsulation process. In addition to the material(s) to be encapsulated, it typically comprises a capsule shell-forming material and optionally a catalyst for the wall forming reaction.

The term "external phase" is defined as the continuous phase during a liquid-liquid encapsulation process. It typically comprises a solvent, a shell-forming material and optionally a dispersant to stabilize the internal phase and/or a catalyst for the shell-forming reaction.

In one embodiment, the core of the microcapsules or capsules may be an electrophoretic composition comprising pigment-containing microparticles dispersed in a dielectric solvent or solvent mixture, thus resulting in a "pigment-containing microparticles in microcapsules or capsules" scenario.

The microcapsules or capsules of the present invention are prepared by dispersing an internal phase (or dispersed phase) in an external phase (or continuous phase) followed by a shell-forming process via an interfacial or in-situ polymerization or crosslinking reaction.

I. Internal Phase (Dispersed Phase)

The internal phase generally comprises charged pigment particles or pigment-containing microparticles dispersed in a dielectric solvent or solvent mixture, a reactive monomer or oligomer for shell formation, and optionally a charge control agent and additives described below.

a. Charged Pigment Particles or Pigment-Containing Microparticles

The pigment may be white or color, and may be organic or inorganic. Examples of white pigments include hollow particles, $BaSO_4$, $ZnO$, $CaCO_3$, $TiO_2$ and the like. Examples of color pigments include phthalocyanine blue, phthalocyanine green, diarylide yellow, diarylide AAOT yellow, quinacridone, azo, rhodamine, perylene pigment series from Sun Chemical, Hansa yellow G particles from Kanto Chemical, Carbon Lampblack from Fisher and the like. Particle size is in the range of 0.01–5 microns and preferably in the range of 0.05–2 microns. The particles should have acceptable optical characteristics, should not be swollen or softened by the dielectric solvent and should be chemically stable. The resulting suspension must also be stable against sedimentation, creaming or flocculation under normal operating conditions.

Alternatively, the pigment particles may be pigment-containing microparticles. The particle size of the pigment-containing microparticles is in the range of 0.1–10 microns and preferably in the range of 0.3–3 microns. The preparation of the pigment-containing microparticles is disclosed in the co-pending applications, U.S. Ser. No. 60/345,936 filed on Jan. 3, 2002, U.S. Ser. No. 60/345,934 filed on Jan. 3, 2002, U.S. Ser. No. 10/335,210 filed on Dec. 31, 2002, U.S. Ser. No. 10/335,051 filed on Dec. 31, 2002, U.S. Ser. No. 60/400,021 filed on Jul. 30, 2002, Ser. No. 60/418,078 filed on Oct. 10, 2002 and U.S. Ser. No. 10/632,171 filed on Jul. 30, 2003, the contents of all of which are incorporated herein in their entirety by reference.

Briefly, the pigment-containing microparticles may be prepared by a coating or microencapsulation process involving the use of a protective colloid or dispersant to form part of the charged shell of pigment-containing microparticles. In the process, an internal phase dispersion comprising primary pigment particles, such as $TiO_2$, a reactive monomer or oligomer and optionally a diluent is emulsified into a continuous phase which comprises a protective colloid, preferably a reactive protective colloid, in a fluorinated solvent or solvent mixture. During the emulsification step, a hard shell is formed around each of the droplets of the internal phase as a result of the interfacial polymerization or crosslinking between the reactive monomer or oligomer from the internal phase and the reactive protective colloid or a multifunctional reactant such as a diamine, triamine, diol, triol, diisocyanate, triisocyanate, diepoxide, triepoxide or a reactive charge controlling agent from the continuous phase. The internal phase may be post-cured by a radical or condensation polymerization or crosslinking mechanism during or after the shell-forming interfacial reaction step. The process allows the pigment to be density-matched to the dielectric solvent. Suitable reactive protective colloids and charge control agents for the preparation of pigment-containing microcapsules are disclosed in the copending applications, U.S. Ser. Nos. 60/345,934 and 60/345,936 both filed on Jan. 3, 2002 and U.S. Ser. Nos. 10/335,210 and 10/335,051 both filed on Dec. 31, 2002, the contents of which are incorporated herein by reference in their entirety.

The emulsification of the internal phase into the continuous phase may be accomplished by either a direct or inverse emulsification process.

Alternatively, the pigment-containing microparticles may be prepared by a microencapsulation process involving the use of a fluorinated quaternary salt or the fused ring or polynuclei derivatives or isomers thereof, as disclosed in the copending applications, U.S. Ser. No. 60/400,021 filed on Jul. 30, 2002, Ser. No. 60/418,078 filed on Oct. 10, 2002 and U.S. Ser. No. 10/632,171 filed on Jul. 30, 2003, the contents of which are incorporated herein in their entirety by reference. In this case, the internal phase dispersion of the process comprises primary pigment particles and a reactive monomer or oligomer as described above. The continuous phase may optionally comprise a reactive protective colloid in a fluorinated solvent. The quaternary salt or a derivative thereof may be added to the internal dispersion phase, the continuous phase or both, depending on the solubility of the quaternary salt.

b. Dielectric Solvent or Solvent Mixture

Suitable dielectric solvent or solvent mixture for the internal phase generally have a low vapor pressure, low viscosity and a dielectric constant in the range of about 1.7 to about 30, preferably about 1.7 to about 5. In the context of the present invention, halogenated, particularly fluorinated, solvents or solvent mixtures are useful.

The fluorinated solvent may have a fluorine content higher than 20% by weight, preferably higher than 50% by weight.

Examples of suitable fluorinated solvents include, but are not limited to, perfluoro solvents such as perfluoroalkanes or perfluorocycloalkanes (e.g., perfluorodecalin), perfluoroarylalkanes (e.g., perfluorotoluene or perfluoroxylene), perfluoro-tert-amines, perfluoropolyethers such as those from Galden/Fomblin and perfluoropolyethers HT series and hydrofluoropolyethers (ZT series) from Solvay Solexis, FC-43 (heptacosafluorotri-butylamine), FC-70 (perfluorotri-n-pentylamine), PF-5060 or PF-5060DL (perfluorohexane) from 3M Company (St. Paul, Minn.), low molecular weight (preferably less than 50,000, more preferably less than 20,000) polymers or oligomers such as poly(perfluoropropylene oxide) from TCI America (Portland, Oreg.), poly(chlorotrifluoroethylene) such as Halocarbon Oils from Halocarbon Product Corp. (River Edge, N.J.) and Demnum lubricating oils from Daikin Industries. Perfluoropolyethers and hydrofluoropolyethers such as Solvay Solexis HT-170, HT-200, HT-230, ZT-180 or DuPont trifluoro(trifluoromethyl)-oxirane homopolymers (such as K4, K-6 and K-7 fluids) are particularly useful.

c. Shell-Forming Materials: Halogenated Monomers or Oligomers

The shell-forming material in the internal phase of the present invention is typically selected from a group consisting of halogenated, preferably fluorinated, monomers or oligomers for an interfacial polymerization or crosslinking reaction. Suitable fluorinated monomers or oligomers include fluorinated multifunctional amines, isocyanates, thioisocyanates, epoxides, acid chlorides, acid anhydrides, chloroformates, alkoxysilanes, amines, urea, thiourea, thiols, alcohols and precondensates thereof.

The fluorinated shell-forming monomer or oligomer may have a fluorine content higher than 10% by weight, preferably higher than 30% by weight.

Examples of suitable amino- or hydroxy-functionalized fluorinated, particularly perfluorinated, shell-forming materials include those derived from fluorohydrocarbons, poly(perfluoroalkyl acrylate), poly(perfluoroalkyl methacrylate), hydrofluoropolyethers, perfluoropolyethers (from DuPont and Solvay Solexis) and the like. Some non-limiting examples of the fluorinated shell-forming materials of the present invention and their synthesis schemes are listed below:

(A) Polyfluoroether Amines (Type I):

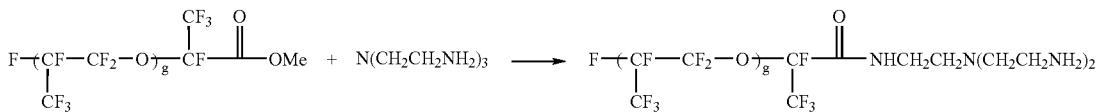

(B) Fluorinated Amines (Type II):

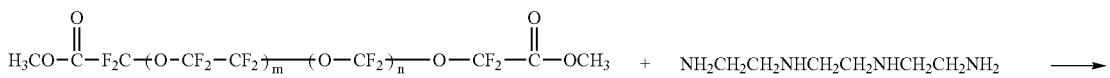

-continued
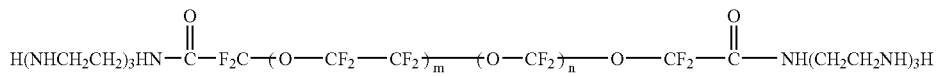
(C) Fluorinated Polyols:
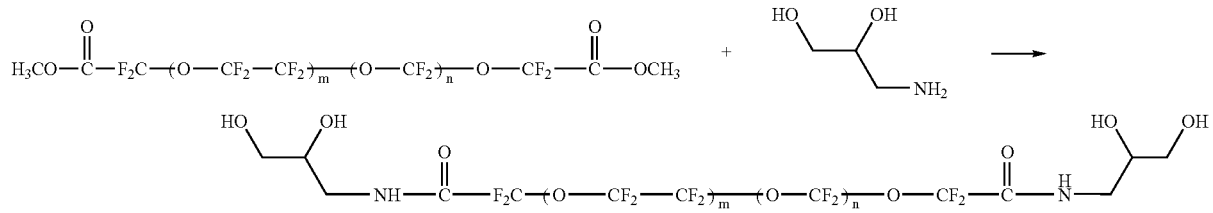
(D) Fluorinated Polyisocyanates (Type I):
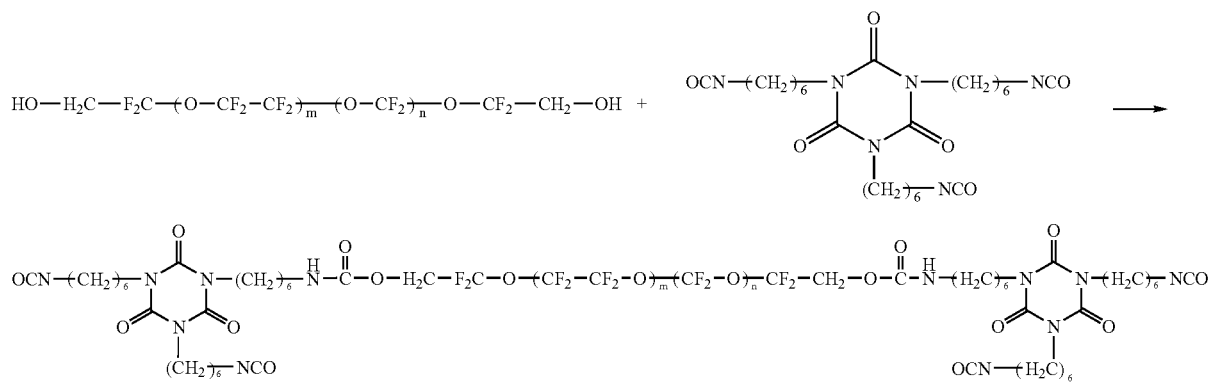
(E) Fluorinated Polyisocyanates (Type II):
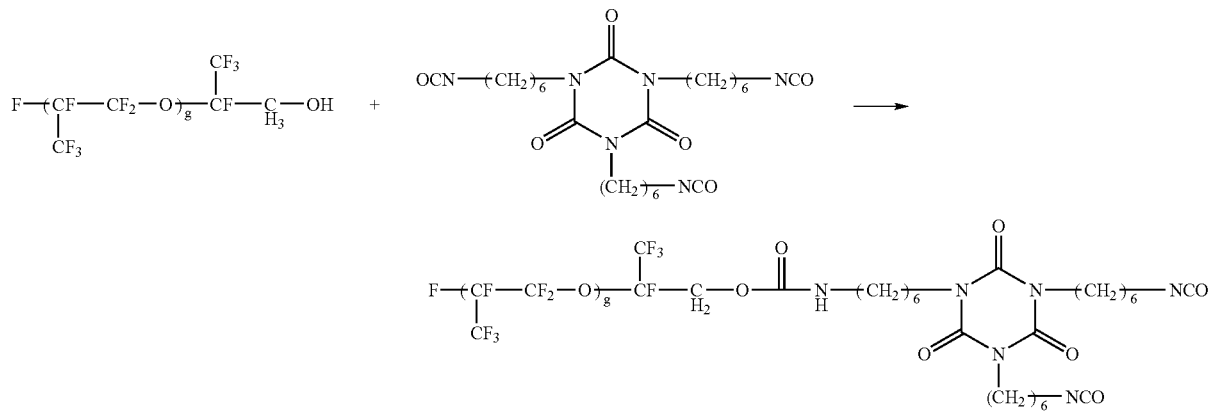
(F) Fluorinated Polyepoxides:
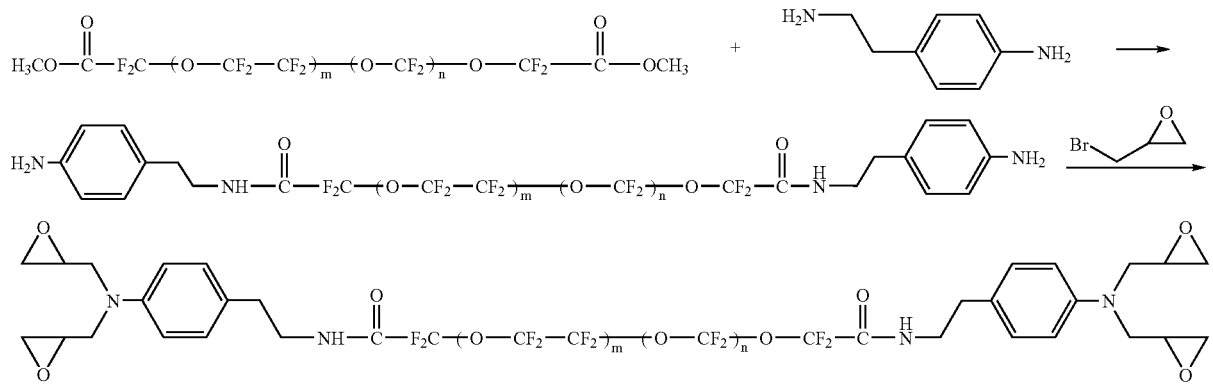

The integers, g, m and n are independently in the range of 1–10,000, preferably in the range of 1–5,000 and more preferably in the range of 3–500. The sum of m and n is in the range of 3–5,000, preferably in the range of 3–500. Particularly suitable fluorinated shell-forming materials may have molecular weights ranging from 300 to 100,000, preferably from 500 to 30,000. In addition to the non-limiting examples of fluorinated esters and alcohols described in the above synthetic schemes, other useful starting materials for the synthesis of the shell-forming monomers and oligomers may include, but are not limited to, methyl perfluorononanoate, methyl perfluotetradecanoate, 1,4-bis(epoxypropyl)octafluorobutane, methyl perfluorooctadecanoate, dimethyl perfluoro-1,10-decanedicaboxylate, dimethyl perfluorosebacate 1H, 1H, 8H, 8H-decafluoro-1, 8-octanediol and the like. The halogenated shell-forming monomer or oligomer may be added into the internal phase in the amount of about 3 to about 50% by weight, preferably about 5 to about 30% by weight, based on the total internal phase.

d. Charge Control Agents

To be switchable by an electric field, the pigment particles or pigment-containing microparticles must be charged. The pigment particles or pigment-containing microparticles may carry an inherent charge, or may be charged using a charge control agent or may acquire, for example, a triboelectric charge when suspended in the dielectric solvent. Suitable charge control agents are well known in the art; they may be polymeric or non-polymeric in nature and may also be ionic or non-ionic, including ionic surfactants such as Aerosol OT, sodium dodecylbenzenesulfonate, metal soap, calcium petronate, OLOA1200 (Chevron, Somerset, N.J.), Emphos D-70–30C (a phosphated mono/diglyceride from Witco Chemical Co., Greenwich, Conn.), Solsperse 17000 (a polymeric dispersant from Avecia Ltd., Blackley, Manchester, UK), Span surfactants (from ICI Americas, Inc., Wilmington, Del.), polybutene succinimide, maleic anhydride copolymers, vinylpyridine copolymers, vinylpyrrolidone copolymers (such as Ganex from International Specialty Products), acrylic or methacrylic acid copolymers, N,N-dimethylaminoethyl methacrylate or acrylate copolymers or the like. Fluorosurfactants are particularly useful as charge controlling agents in perfluorocarbon solvents. They include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and UR from DuPont.

Suitable charged pigment dispersions may be manufactured by any of the well-known methods including grinding, milling, attriting, microfluidizing, ultrasonic techniques and the like. For example, primary pigment particles in the form of a fine powder are added to the suspending solvent and the resulting mixture is ball milled or attrited for several hours to break up the highly agglomerated dry pigment powder into primary particles. A dye or colorant to generate the color of the suspending medium may also be added to the suspension during the milling process.

When a fluorinated solvent or solvent mixture is used as the dielectric solvent to disperse the primary pigment particles or pigment-containing microparticles, the charge of the pigment particles or pigment-containing microparticles may be provided by a charge control agent comprising:

(i) a soluble fluorinated electron accepting or proton donating compound or polymer in the continuous phase and an electron donating or proton accepting compound or polymer on the particles; or (ii) a soluble fluorinated electron donating or proton accepting compound or polymer in the continuous phase and an electron accepting or proton donating compound or polymer on the particles.

The electron donating or proton accepting or the electron accepting or proton donating compound or polymer may be adsorbed or chemically bonded on the surface of the pigment particles or pigment-containing microparticles.

Another alternative for the charge control system results from the presence of the required donor/acceptor components in the same molecule. For example, one part of a molecule can represent, and function as, the soluble fluorinated donor/acceptor in the continuous phase, and another part can represent, and function as, the complementary acceptor/donor on the particle surface. The presence of both the soluble fluorinated donor/acceptor and the complementary acceptor/donor in the same charge control agent molecule results in high surface activity and strong adsorption of the charge control agent onto the pigment particles or pigment-containing microparticles.

The details of the charge control system described above are disclosed in co-pending U.S. patent application Ser. No. 60/345,936 filed on Jan. 3, 2002, Ser. No. 10/335,210 filed on Dec. 31, 2002, 60/400,021 filed on Jul. 30, 2002, 60/418, 078 filed on Oct. 10, 2002 and 10/632,171 filed Jul. 30, 2003, all of which are incorporated herein by reference in their entirety.

e. Colorants

In addition to the charged primary color pigment particles or pigment-containing microparticles mentioned above, a colorant having a color contrast to the primary color particles may be added to the dielectric solvent or solvent mixture. The contrast colorant may be a dye or pigment. Nonionic dyes and pigments are particularly useful. Examples of useful colorants include, but are not limited to, Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, and anthraquinone blue, anthraquinone yellow 114, anthraquinone reds 111 and 135, anthraquinone green 28 from Aldrich and the like. Perfluorinated dyes and pigments are particularly useful when a fluorinated or perfluorinated dielectric solvent is used. If the contrasting colorant is insoluble in the dielectric solvent, a non-charged dispersion of the colorant is preferred. Particle size is preferably in the range of 0.01–5 microns, more preferably in the range of 0.05–2 microns. If the contrasting colorant particles are charged, they preferably carry a charge polarity opposite to that of the charged primary color pigment particles or pigment-containing microparticles. If both types of particles carry the same charge, then they should have different charge density or different electrophoretic mobility. In any case, the dye or pigment used in EPDs must be chemically stable and compatible with other components in the dispersion. The contrast colorant may be dissolved or predispersed in the dielectric solvent and added into the electrophoretic fluid containing the primary color pigment dispersion. For a black/white EPD, the dispersion may comprise charged white particles of titanium oxide ($TiO_2$) dispersed in a blackened fluorinated dielectric solvent. A black contrast colorant such as Pylam Spirit Black and Fast Spirit Black from Pylam Products Co., Arizona, Sudan Black B from Aldrich, Thermoplastic Black X-70 from BASF, carbon black or graphite may be used to generate the black color of the solvent. Modification of the dyes or pigments by introducing fluorinated or perfluorinated groups such as $C_nF_{2n+1}$ (n=4–12) is very useful to increase their solubility or dispensability in highly fluorinated solvents. For a subtractive color system, the charged $TiO_2$ particles may be suspended in a fluorinated solvent of a cyan, yellow or magenta color. The cyan, yellow or magenta color may be generated via the use of a dye or a pigment. For an additive color system, the charged $TiO_2$ particles may be suspended in a fluorinated solvent of a red, green or blue color generated also via the use of a dye or a pigment. For most applications, the additive color system is preferred.

Examples of the fluorinated dyes or pigments include fluorinated metal phthalocyanine or naphthalocyanine, fluorinated perylene, diazo, anthraquinone or quinacridone and fluorinated carbon black or polyaniline dyes. Suitable metals for the phthalocyanine or naphthalocyanine dyes include, but are not limited to, Cu, Si, Mg, Zn, Fe, Co, Ti, and Al. The Si phthalocyanine or napthalocyanine dyes are disclosed in copending applications, U.S. Ser. No. 60/381,263 filed on May 17, 2002 and U.S. Ser. No. 10/439,428 filed May 15, 2003, the contents of which are incorporated herein by reference in their entirety. Some useful fluorinated Cu phthalocyanine dyes are disclosed in U.S. Pat. No. 3,281,426, copending application Ser. No. 60/381,263 filed on May 17, 2002, Ser. No. 10/439,428 filed May 15, 2003, No. 60/411, 854 filed on Sep. 18, 2002 and Ser. No. 10/663,249 filed Sep. 15, 2003, the contents of which are incorporated herein by reference.

The electrophoretic composition (i.e., the internal phase) may be colored by a single Si dye or a single Cu dye or a combination of the two dyes. When a mixture of the two dyes is used, the weight ratio of the Si dye to the Cu dye is preferably in the range of 7:3 to 1:9, more preferably in the range of 4:6 to 2:8.

f. Other Additives

In addition to the ingredients mentioned above, additives such as catalysts for the shell-forming reaction, charge adjuvants, electrolytes, antioxidants, UV stabilizers, singlet oxygen quenchers, gas absorbers, surfactants, protective colloids or polymeric dispersants or rheology modifiers may also be incorporated in the internal phase. The viscosity ratio between the internal and external phases is important in particle size control. In some cases, a fugitive solvent or diluent may be used to reduce the viscosity of the internal phase and subsequently stripped off during or after the encapsulation process.

II. External Phase (Continuous Phase)

The external phase in general may comprise a solvent, a complementary chain extender or crosslinker for the shell-forming material in the internal phase, and optionally a protective colloid or polymeric dispersant to stabilize the internal phase.

a. Organic Solvent(s)

An organic solvent is used in the present invention. Suitable organic solvents are those immiscible with the halogenated or fluorinated solvents or solvent mixtures used in the internal phase. They should not interfere with the shell-forming reaction. Solvents having a boiling temperature between 40–200° C. are preferred. Hydrophobic solvents with a boiling temperature between 60–150° C. are most preferred. Examples of suitable organic solvents for the external phase include, but are not limited to, organic solvents such as hexane, cyclohexane, heptane, octane, nonane, decalin, docecylbenzene, Isopars, nonapar, ethyl acetate, propyl acetate, butyl acetate, acetone, methylethylketone (MEK), methylpropylketone (MPK), methylbutylketone (MBK), tetrahydrofuran (THF), 1–2-dialkoxy ethane, 2-methoxyethyl acetate and the like.

b. Complementary Chain Extenders or Crosslinkers

Suitable complementary chain extenders or crosslinkers for the interfacial shell-forming reaction may be multifunctional reactants comprising a reactive functional group capable of interfacial polymerization/crosslinking with the functional monomer or oligomer from the internal phase to form a crosslinked shell around the halogenated, particularly fluorinated, internal phase of the present invention.

The complementary reactive group of the multifunctional reactant in the external phase is determined by the shell-forming monomer or oligomer used in the internal phase or vice-versa. Examples of pairs of reactive groups in the two phases may include, but are not limited to, amine/isocyanate, amine/thioisocyanate, amine/acid chloride or anhydride, amine/chloroformate, amine/epoxide, alcohol/isocyanate, alcohol/thioisocyanate, thiol/isocyanate, thiol/thioisocyanate, water/isocyanate, carbodiimide/epoxide, alcohol/siloxane and the like.

The functional groups of the two phases may be reversed. For example, in one embodiment, the shell-forming reactant in the internal phase may be a fluorinated triisocyanate or polyisocyanate, and the complementary chain extender or crosslinker in the external phase may be a diamine or triamine. In another embodiment, a fluorinated diamine or triamine may be used in the internal phase whereas a triisocyanate or polyisocyanate is used in the external phase.

Amines and alcohols suitable as the complementary reactant in the external phase include, but are not limited to, ethylene diamine, diethylene triamine, isophorone diamine, cyclohexyl diamine, triaminoethyl amine, Jeffamine, polyimine, triethanolamine, butanediol, pentanediol, hexanediol, trimethylolpropane, pentaerythritol, dipentaerythritol, N,N,N',N'-tetrakis-(2-hydroxyethyl) ethylenediamine, acrylic polyols such as copolymers of 2-hydroxyethyl acrylate, polyester or polyether polyols such as Baycoll, Rucoflex or Desmophen from Bayer.

Isocyanates and epoxides suitable as the complementary chain extenders or crosslinkers in the external phase include, but are not limited to, polyisocyanates such as Desmodur® polyisocyanates from Bayer, polyepoxides such as (3,4-epoxycyclohexyl)methyl-3,4-epoxycyclohexanecarboxylate, copolymers of glycidyl acrylate, Loctite 3355 from Loctite, Epon epoxy resins from Resolution Performance Products (Houston, Tex.) or the like.

Complementary chain extenders or crosslinkers having more than one function group for the shell-forming reaction are also useful. Examples include, but are not limited to, Silquest organofunctional silanes such as ethanolamine, diethanolamine, aminosilanes A-1100, A-1120, A-2120, A-1130 or A-1170, uredosilanes Y-11542, isocyanatosilanes A-1310, epoxysilanes A-187 or A-186, thiol silane A-189, olefinic silanes A-171 or A-174 and the like.

When a highly fluorinated solvent is used as the dielectric solvent in the internal phase, a complementary chain extender or crosslinker with a low degree of fluorination (less than 30% by weight) may be used in the external phase to improve the interfacial polymerization/crosslinking reaction and the resultant dispersion stability.

c. Protective Colloids

Protective colloids are surfactants, dispersants or polymers dissolved in the external phase to facilitate the emulsification of the internal phase in the external phase and stabilize the emulsion formed. The selection of protective colloids depends on the solvents used in the external phase. For ketone, ester and ether types of solvents, suitable protective colloids include, but are not limited to, acrylate or methacrylate copolymers, styrene copolymers, maleic anhydride copolymers, vinylether copolymers, vinylacetate copolymers, ethylene glycol or propylene glycol copolymers, pyrrolidone copolymers, ethyloxazoline copolymers, polyesters, siloxane copolymers, and block copolymers or graft copolymers thereof comprising a fluorinated block or graft chain may be used. For hydrocarbon solvents, vinylalkane copolymers, diene copolymers such as polybutadiene and polypentadiene copolymers, long-chain acrylate or methacrylate copolymers such as dodecylacrylate copolymers or block copolymers or graft copolymers thereof comprising a fluorinated block or graft chain may be used. Commercially available polymeric dispersants such as Solsperse hyperdispersants from Avecia, Ltd. (Charlotte, N.C.), Disparlon dispersing agents from King Industries (Norwalk, Conn.) or Carboset copolymers from BFGoodrich (Cleveland, Ohio) are also useful.

When a highly fluorinated solvent is used as the dielectric solvent in the internal phase, a protective colloid with a low degree of fluorination (less than 30% by weight) may be used to improve the interfacial polymerization/crosslinking reaction and the resultant dispersion stability.

d. Other Optional Additives

Other optional additives include, but are not limited to, catalysts for the shell-forming reaction, charge adjuvants, electrolytes, antioxidants, UV stabilizers, singlet oxygen quenchers, gas absorbers, surfactants, protective colloids or polymeric dispersants or rheology modifiers may also be incorporated in the external phase.

III. Encapsulation Process

The electrophoretic capsules of the present invention are preferably prepared by the interfacial polymerization/crosslinking encapsulation process during or after the emulsification of internal phase in the continuous phase. To further improve the physicomechanical properties of the capsules, a second shell may be formed around the first shell by in-situ polymerization from the external phase.

The internal phase is prepared by dispersing pigment or pigment-containing microparticles, such as $TiO_2$ particles, into a solution comprising a halogenated shell-forming material in a halogenated, preferably fluorinated, dielectric solvent or solvent mixture. The internal phase may also comprise a contrast colorant, a charge control agent and other additives. The internal phase dispersion may be prepared by a conventional dispersing or milling mechanism such as homogenizer, sonicator, colloidal mill, high shear mixer or the like. Alternatively, pigment-containing microparticles with chemically bonded protective colloid(s) and/or charge control agent(s) and density matched to the dielectric solvent may be prepared by any of the methods disclosed in copending U.S. patent applications, Ser. Nos. 60/345,936, 60/345,934, Ser. Nos. 10/335,210, 10/335,051, 60/400,021 60/418,078 and Ser. No. 10/632,171 identified above.

The external phase may comprise the complementary chain extender(s) or crosslinker(s) dissolved in an organic solvent which is immiscible with the dielectric solvent of the internal phase. When polymer-coated pigment-containing microparticles are used in the internal phase, the organic solvent used in the external phase should not be a good solvent or plasticizer for the polymer matrix of the pigment-containing microparticles.

To form the electrophoretic capsules, the internal phase is emulsified into the continuous phase. A shell is then formed around each of the internal phase droplets as a result of the interfacial polymerization/crosslinking between the halogenated shell-forming monomer(s) or oligomer(s) from the internal phase and the complementary chain extender(s) or crosslinker(s) from the external phase.

In addition to the complementary chain extenders or crosslinkers for the shell-forming reaction(s), a protective colloid may also be optionally added to the external phase to improve the dispersion stability and particle size distribution. The protective colloid may be charged or non-charged. A reactive protective colloid comprising a functional group to chemically bond the protective colloid onto the capsule surface may also be used to improve the dispersion stability and rheology properties of the electrophoretic capsule dispersion.

The size of the electrophoretic capsules of the present invention may range from 20–300 microns, preferably 30–150 microns and more preferably 40–100 microns.

An electrophoretic display or device using the high performance capsules of the present invention as display cells may be assembled following the procedures as disclosed in U.S. Pat. No. 5,930,026. Alternatively, the capsules may be coated onto a first substrate or electrode layer. The capsule layer is subsequently overcoated with a protective overcoat or a second electrode layer by a method such as coating, printing, vapor deposition, sputtering or a combination thereof. Protective overcoats such as an antireflection, scratch resistant or antiglare coating are particularly useful and may be applied onto the capsule layer directly or on the electrode layer(s) to further improve the optical or physicomechanical properties of the finished panel.

The present invention has many advantages. For example, the capsules prepared from the present invention are not sensitive to humidity and may have a high switching rate because highly efficient charge control agents may be used in the internal phase without leaking into the interface between the capsules and the continuous external phase. In addition, the capsules may be used directly in an electrophoretic display without the need of purifying the undesirable ionic impurities and other soluble additives as required in the traditional aqueous microencapsulation process.

EXAMPLES

Preparation 1

Preparation of Fluorinated Isocyanates as Shell-Forming Materials in the Internal Phase

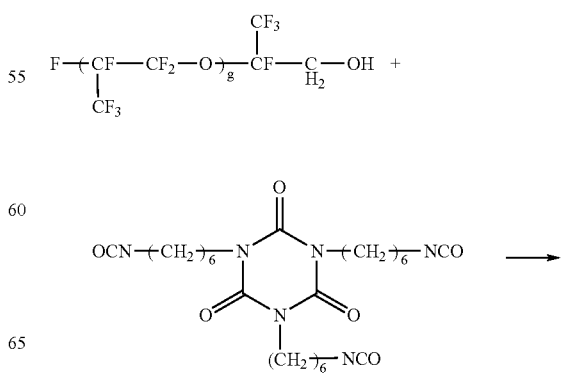

-continued

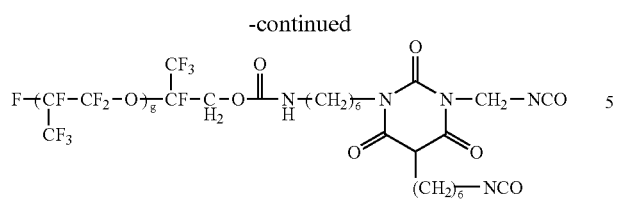

12 Gm of Krytox® alcohol (g=~6, and MW=~1200, from DuPont) was dissolved in 50 gm of 1,1,2-trichlorotrifluoroethane. The resulting solution was added dropwise, over a four hour period, into a refluxing solution containing 5.85 gm Desmodur® N3400 (EW=195, from Bayer), 30 gm of 1,1,2-trichlorotrifluoroethane and 5 gm of α,α,α-trifluorotoluene under stirring. Refluxing was continued for another 10 hours to complete the reaction. A viscous liquid was obtained after the solvent was stripped off. Infrared spectrum showed emerging band at 1730 cm$^{-1}$ characteristic of the urethane group in the product.

A series of fluorinated multifunctional isocyanates were synthesized by the same reaction procedure from various fluoro alcohols, including 1H,1H,11H-perfluoro-1-undecanol (Aldrich), Zonyl FSO and FSN (DuPont) and 2,2,3,3,4,4,5,5-octafluoro-1-pentanol (Aldrich).

Similarly, other multifunctional halogenated, particularly fluorinated, isocyanates may be synthesized by reacting halogenated, particularly fluorinated, diols such as Fluorolink D (from Solvay Solexis) with an excess of Desmodure N3400 to form a fluorinated tetraisocyanate.

Preparation 2

Preparation of Fluorinated Epoxides as Shell-Forming Materials in the Internal Phase A fluorinated epoxide may be synthesized according to the following reaction schemes. Fluorolink D (from Solvay Solexis) is treated with an excess of sodium hydride, and allyl bromide is added to the resultant mixture to yield a fluorinated di-ene which is subsequently oxidized with peracid to form a fluorinated diepoxide.

Preparation 3

Synthesis of Fluorinated Amines as Shell-Forming Materials in the Internal Phase

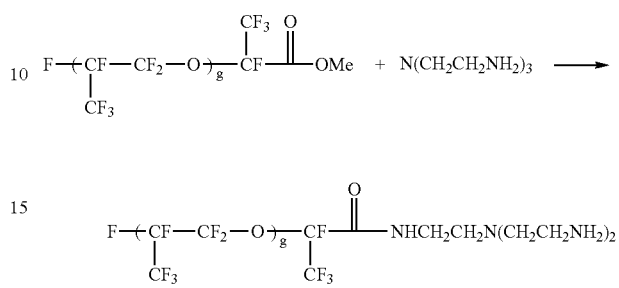

17.8 Gm of Krytox® methyl ester (DuPont, MW=about 1780, g=about 10) was dissolved in a solvent mixture containing 12 gm of 1,1,2-trichlorotrifluoroethane (Aldrich) and 1.5 gm of α,α,α-trifluorotoluene (Aldrich). The resultant solution was added drop-by-drop into a solution containing 7.3 gm of tris(2-aminoethyl)amine (Aldrich) in 25 gm of α,α,α-trifluorotoluene and 30 gm of 1,1,2-trichlorotrifluoroethane over 2 hours with stirring at room temperature. The mixture was then stirred for another 8 hours to allow the reaction to complete. The IR spectrum of the crude product clearly indicated the disappearance of C=O vibration for methyl ester at 1780 cm$^{-1}$ and the appearance of C=O vibration for the amide product at 1695 cm$^{-1}$. Solvents were removed by rotary evaporation followed by vacuum stripping at 100° C. for 4–6 hours. The crude product was then dissolved in 50 mL of PFS2 solvent (perfluoropolyether from Solvay Solexis) and extracted with 20 mL of ethyl acetate three times, then dried to yield 17 gm of purified product ($R_f$-amine1900) which showed excellent solubility in HT-200.

Other reactive $R_f$ amines having different molecular weights such as $R_f$-amine4900 (g=about 30), $R_f$-amine2000

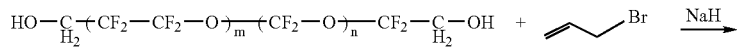

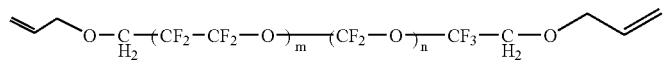

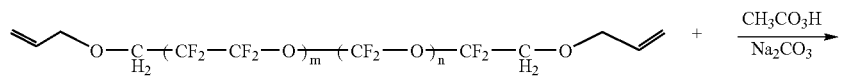

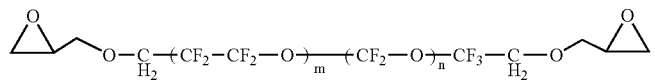

Alternatively, a multifunctional fluorinated epoxide may be synthesized by reacting a multifunctional fluorinated alcohol with epichlorohydrin.

(g=about 11), $R_f$-amine800 (g=about 4) and $R_f$-amine650 (g=about 3) may also be synthesized according to the same procedure.

17

Preparation 4

Preparation of $TiO_2$-Containing Microparticles in a Fluorinated Solvent 9.50 Gm of Desmodur® N3400 aliphatic polyisocyanate (from Bayer AG) and 0.49 gm of TEA (triethanolamine from Dow Chemicals) were dissolved in 3.79 gm of acetone. To the resultant solution, 13 gm of $TiO_2$ R706 (from DuPont) was added and homogenized for 2.5 minutes with a rotor-stator homogenizer (IKA ULTRA-TURRAX T25) at room temperature. A solution containing 0.45 gm of F8POH (See structure below) prepared according to the procedure as disclosed in the copending U.S. patent applications, Ser. Nos. 60/400,021, 60/418,078 and Ser. No. 10/632,171, 1.67 gm of 1,5-pentanediol (BASF), 1.35 gm of polypropylene oxide (mw=750, from Aldrich) and 2.47 gm of acetone (99.9% minimum by GC, Burdick & Jackson) was added and homogenized for 1 minute; and finally 0.32 gm of a 2% solution of dibutyltin dilaurate (Aldrich) in acetone was added and homogenized for an additional minute.

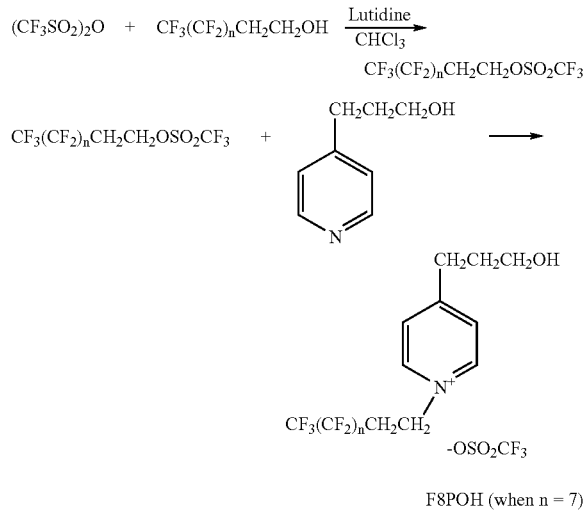

F8POH (when n = 7)

To the resultant slurry, 0.9 gm of $R_f$-amine4900 from Preparation 3 in 40.0 gm of HT-200 (from Solvay Solexis) was added and homogenized for 2 minutes, followed by addition of additional 0.9 gm of the $R_f$-amine4900 and 0.35 g of a perfluorinated Cu phthalocyanine dye, $CuPc-C_8F_{17}$ prepared according to the procedures taught in U.S. Pat. No. 3,281,426 (1966), in 33.0 gm of HT-200 and homogenization for 2 minutes.

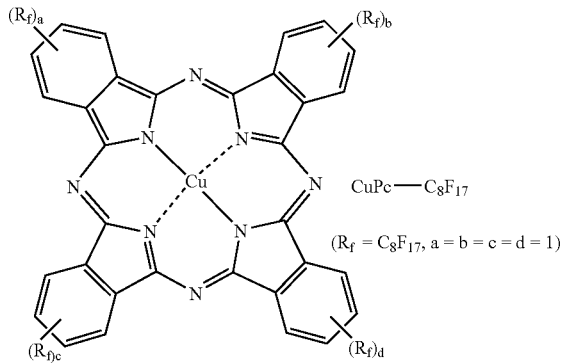

18

A low viscosity dispersion of $TiO_2$-containing microparticles was obtained. The microparticle dispersion was then heated at 50° C. overnight and then stirred at 80° C. for an additional hour under low shear to post-cure the particles. The post-cured microparticle dispersion was filtered through a 400 mesh (38 micrometer) screen and the solid content of the filtered dispersion was measured to be 32% by weight with an IR-200 Moisture Analyzer (Denver Instrument Company). The particle size distribution of the filtered dispersion was measured with a Beckman Coulter LS230 Particle Analyzer. The mean diameter was 1.02 μm and the standard deviation was 0.34 μm.

Example 1

Microencapsulation of Electrophoretic Internal Phase by Interfacial Polymerization/Crosslinking An electrophoretic internal phase containing 15.7 parts by weight of a fluorinated polyisocyanate prepared in Preparation 1, 40 parts by weight of the $TiO_2$-containing microparticle dispersion (32% solid) prepared in Preparation 4, 1 part by weight of $CuPc-C_8F_{17}$ disclosed in Preparation 4, and 43.3 parts by weight of HT-200 is mixed thoroughly and filtered through a 400 mesh screen. The filtered internal phase is emulsified at a low shear into an external phase containing 1.3 part by weight of triethylenetetraamine, 3 parts by weight of Solsperse hyperdispersant 3000 (from Avecia, Ltd.), 2 parts by weight of Kraton D1107 (from Kraton Polymer, Houston, Tex.), 2 parts by weight of 1% solution of dibutyltin dilaurate (DBTDL) in MEK and 200 parts by weight of a mixture of MEK and Isopar G (2:8).

The interfacial crosslinking reaction is allowed to complete at 50° C. for 3 hours, post cured at the reflux temperature for an additional hour, and filtered through a 100 mesh screen. The average capsule size is about 60 μm.

10 Parts by weight of the resultant electrophoretic capsules are then mixed with a UV curable binder comprising 0.7 parts by weight of Ebecry 8301 (From UCB Chemical Corp., Smyrna, Ga.) and 0.7 parts by weight of IROSTIC P9815-20 (from Huntsman Polyurethanes), and 0.02 parts by weight of Irgacure 907, coated and dried on an ITO/PET substrate (5 mil OC50 from CPFilms, Martinsville, Va.). The coating thickness is about 80 um. The coated capsule layer is UV partially cured and laminated onto a second electrode layer and UV post cured to complete the EPD assembly.

Example 2

The encapsulation procedure of Example 1 is repeated except that the Solsperse hyperdispersant 3000, Kraton D1107 and the external phase solvent (MEK/IsoparG; 2/8) are replaced by Butvar 72 (from Solutia Inc., St. Louis, Mo.) and IROSTIC P9815-20 (from Huntsman Polyurethanes) and MPK/IsoparG (8/2), respectively.

10 Parts by weight of the resultant electrophoretic capsules are then mixed with a UV curable binder comprising 0.7 parts by weight of Ebecry 8301 (From UCB Chemical Corp., Smyrna, Ga.), 0.7 parts by weight of IROSTIC P9815-20 (from Huntsman Polyurethanes), and 0.02 parts by weight of Irgacure 907, coated and dried on an ITO/PET substrate (5 mil OC50 from CPFilms, Martinsville, Va.). The coating thickness is about 55 μm. The coated capsule sheet is UV partially cured and cut in half. One of them is laminated onto a second electrode layer and UV post cured to complete the EPD assembly. The other half is overcoated with about 2.5 gm/ft² of the same UV curable binder (50/50, Ebecry 8301/IROSTIC P9815-20) and UV post cured. The former is evaluated as an electrophoretic display, and the latter is evaluated as a rewritable recording media.

Example 3

An electrophoretic internal phase containing 20 parts by weight of a fluorinated amine, $R_f$-amine1900 (mw=~1900) prepared in Preparation 3, 40 parts by weight of the $TiO_2$-containing microparticle dispersion (32% solid) prepared in Preparation 4, 1 part by weight of $CuPc-C_8F_{17}$, and 39 parts by weight of HT-200 is mixed thoroughly and filtered through a 400 mesh screen. The filtered internal phase is emulsified at low shear into an external phase containing 4.0 parts by weight of Desmodure N3400 (Bayer), 3 parts by weight of Solsperse hyperdispersant 3000 (from Avecia, Ltd.), 2 part by weight of a Kraton D 1107 (from Kraton Polymer, Houston, Tex.), 2 parts by weight of 1% solution of DBTDL in MEK and 200 parts by weight of a mixture of MEK and Isopar G (2:8).

The interfacial crosslinking reaction is allowed to complete at 50° C. for 3 hours and post cured at reflux temperature for an additional hour. The average capsule size measured by a Coulter counter is about 80 μm.

10 Parts by weight of the resultant electrophoretic capsules are then mixed with a UV curable binder comprising 0.7 parts by weight of Ebecry 8301 (From UCB Chemical Corp., Smyrna, Ga.), 0.7 parts by weight of IROSTIC P9815-20 (from Huntsman Polyurethanes), and 0.02 parts by weight of Irgacure 907, coated and dried on an ITO/PET substrate (5 mil OC50 from CPFilms, Martinsville, Va.). The coating thickness is about 80 μm. The coated capsule layer is UV partially cured and laminated onto a second electrode layer and UV post cured to complete the EPD assembly.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. Non-aqueous electrophoretic capsules comprising a halogenated polymeric shell and an electrophoretic composition enclosed therein wherein said electrophoretic composition comprises charged pigment particles or pigment-containing microparticles dispersed in a dielectric solvent.

2. The non-aqueous capsules of claim 1 wherein said halogenated polymeric shell is a fluorinated polymeric shell.

3. The non-aqueous capsules of claim 1 wherein said dielectric solvent is a halogenated solvent or solvent mixture.

4. The non-aqueous capsules of claim 3 wherein said halogenated solvent is a fluorinated solvent having a fluorine content higher than 20% by weight.

5. The non-aqueous capsules of claim 4 wherein said halogenated solvent is a fluorinated solvent having a fluorine content higher than 50% by weight.

6. The non-aqueous capsules of claim 3 wherein said halogenated solvent or solvent mixture comprises a perfluoropolyether or hydrofluoropolyether.

7. The non-aqueous capsules of claim 6 wherein said fluoropolyether or hydrofluoropolyether is selected from the group consisting of K- and E-series from Du Pont and HT- or ZT- series from Solvay Solexis.

8. The non-aqueous capsules of claim 1 wherein said pigment particles or pigment-containing microparticles are $TiO_2$ particles or $TiO_2$-containing microparticles, respectively.

9. The non-aqueous capsules of claim 1 wherein said pigment-containing microparticles are $TiO_2$-containing microparticles that are density matched to the dielectric solvent.

10. The non-aqueous capsules of claim 1 wherein said electrophoretic composition further comprises a charge control agent.

11. The non-aqueous capsules of claim 1 wherein said electrophoretic composition further comprises a contrast colorant.

12. The non-aqueous capsules of claim 1 wherein said electrophoretic composition further comprises an additive.

13. The non-aqueous capsules of claim 12 wherein the additive is a catalyst for a shell-forming reaction, a charge adjuvant, an electrolyte, an antioxidant, a UV stabilizer, a singlet oxygen quencher, a gas absorber, a surfactant, a protective colloid or polymeric dispersant or a rheology modifier.

14. The non-aqueous capsules of claim 13 wherein said additive is halogenated.

15. The non-aqueous capsules of claim 14 wherein said additive is fluorinated.

16. An electrophoretic display or device comprising:
a) an arrangement of non-aqueous capsules comprising a halogenated polymeric shell and an electrophoretic composition enclosed therein wherein said electrophoretic composition comprises charged pigment particles or pigment-containing microparticles dispersed in a dielectric solvent;
b) a binder binding the non-aqueous capsules to form a capsule layer, and
c) a first substrate on which the capsule layer is coated.

17. The electrophoretic display or device of claim 16 further comprising a protective overcoat on the capsule layer.

18. The electrophoretic display or device of claim 17 wherein said protective overcoat comprises a particulate filler.

19. The electrophoretic display or device of claim 16 further comprising a second substrate disposed onto the capsule layer.

20. The electrophoretic display or device of claim 19 wherein at least one of the two substrates is an electrode substrate.

21. The electrophoretic display or device of claim 19 wherein at least one of the two substrates is transparent.

22. The electrophoretic display or device of claim 19 wherein at least one of the substrates comprises an electrode layer facing the capsule layer.

23. The electrophoretic display or device of claim 22 wherein the substrate or electrode layer is disposed onto the capsule layer by coating, printing, vapor deposition, sputtering, lamination or a combination thereof.

24. The electrophoretic display or device of claim 19 further comprises an overcoat on the surface of the second substrate which is not coated with the capsule layer.

25. The electrophoretic display or device of claim 24 wherein said overcoat comprises a particulate filler.

26. The electrophoretic display or device of claim 16 further comprises an overcoat on the surface of the first substrate which is not coated with the capsule layer.

27. The electrophoretic display or device of 26 wherein said overcoat comprises a particulate filler.

28. The electrophoretic display or device of claim 16 wherein said dielectric solvent is a halogenated solvent or solvent mixture.

29. The electrophoretic display or device of claim 28 wherein the halogenated solvent or solvent mixture is a fluorinated solvent or solvent mixture having a total fluorine content higher than 20% by weight.

30. The electrophoretic display or device of claim 29 wherein the halogenated solvent or solvent mixture is a fluorinated solvent or solvent mixture having a total fluorine content higher than 50% by weight.

31. The electrophoretic display or device of claim 29 wherein said fluorinated solvent is a perfluoropolyether or hydrofluoropolyether.

32. The electrophoretic display or device of claim 31 wherein said fluoropolyether or hydrofluoropolyether is selected from the group consisting of K- and E- series from Du Pont and HT- or ZT- series from Solvay Solexis.

33. The electrophoretic display or device of claim 16 wherein said pigment is $TiO_2$.

34. The electrophoretic display or device of claim 16 wherein said electrophoretic composition further comprises a contrast colorant.

35. The electrophoretic display or device of claim 16 wherein said electrophoretic composition further comprises a charge controlling agent.

* * * * *